United States Patent [19]
Handa et al.

[11] Patent Number: 5,999,498
[45] Date of Patent: Dec. 7, 1999

[54] REDUCED PROFILE MAGNETIC HEAD ASSEMBLY AND METHOD OF MANUFACTURING REDUCED PROFILE MAGNETIC HEAD SUPPORT STRUCTURE

[75] Inventors: Seiichi Handa; Naoto Sugawara; Hitoshi Tamayama; Takeshi Oouchi; Seiichi Watanabe, all of Tokyo, Japan

[73] Assignee: Mitsubishi Denki Kabushiki Kaisha, Tokyo, Japan

[21] Appl. No.: 09/069,235

[22] Filed: Apr. 29, 1998

[30] Foreign Application Priority Data

Sep. 26, 1997 [JP] Japan .................................. 9-262364

[51] Int. Cl.$^6$ ...................................... G11B 11/00
[52] U.S. Cl. ............................... 369/13; 369/103
[58] Field of Search ..................... 369/13, 44.15, 369/44.16, 44.14, 44.23, 44.26, 44.39, 44.28, 44.22, 110, 44.17, 44.18, 44.19, 44.21, 103; 360/114, 59

[56] References Cited

U.S. PATENT DOCUMENTS 5,124,961  6/1992  Yamaguchi et al. ...................... 369/13
5,197,050  3/1993  Murakami et al. ....................... 369/13
5,295,122  3/1994  Murakami et al. ....................... 369/13

FOREIGN PATENT DOCUMENTS 4219640  8/1992  Japan .

Primary Examiner—Ali Neyzari

[57] ABSTRACT

A magnetic head assembly comprises a magnetic head, a magnetic head support structure having a first mount, a second mount and a housing space, and an optical unit fixed to the second mount, capable of projecting a plurality of light beams through a light passage on a recording medium and of receiving a plurality of reflected light beam. The optical unit comprises a light emitting device which emits a light beam, a holographic unit capable of producing a plurality of light beams from the light beam and of focusing the plurality of light beams on a position sensing track formed on the recording medium, and a photodetection device for receiving the plurality of reflected light beams. The holographic unit is partly received in the housing space.

10 Claims, 7 Drawing Sheets

REDUCED PROFILE MAGNETIC HEAD ASSEMBLY AND METHOD OF MANUFACTURING REDUCED PROFILE MAGNETIC HEAD SUPPORT STRUCTURE

BACKGROUND OF THE INVENTION

1. Field of the Invention

The present invention relates to a magnetic head assembly which projects light beams on a disk-shaped recording medium to position a magnetic head. More particularly, the present invention relates to a magnetic head assembly having a small dimension in a direction perpendicular to the recording surface of a recording medium.

2. Background Art

Most disk-shaped recording mediums prevalently used today are 3.5 inch diameter disks having a high track density in the range of about 2100 to 2500 TPI (tracks per inch) and a storage capacity in the range of 100 to 120 Mbyte.

The recording medium is provided with a position sensing track for optical tracking servocontrol for positioning a magnetic head relative to the recording medium. The position sensing track is used for closed-loop optical servocontrol for positioning the magnetic head relative to recording tracks.

FIG. 10 is a diagrammatic view of an optical system included in a conventional magnetic recording apparatus. Shown in FIG. 10 are a disk-shaped recording medium 50, a position sensing track 50a of a predetermined length formed continuously in concentric circles on one surface of the recording medium 50, a magnetic head 51 for writing information to the recording medium 50, or erasing or reading information recorded on the recording medium 50, a cartridge 50b for protecting the recording medium 50, and a rectangular window 50c formed in the cartridge 50 to enable the magnetic head 51 to gain access to the recording medium 50. The magnetic head 51 is bonded to a magnetic head support spring 51a, and the magnetic head support spring 51a supporting the magnetic head 51 is carried by a carriage unit, not shown. The magnetic head 51 slides on the surface of the recording medium 50 provided with the position sensing track 50a.

A light emitting-and-receiving unit 52 is provided with a laser diode 52a, i.e., a light source, and a photodiode 52b, i.e., a photodetection device.

A holographic unit 53 is provided with an optical element, not shown, for dividing light emitted by the laser diode 52a into three light beams, and an optical element, not shown, for guiding the reflected light reflected from the recording medium 50 to the photodiode 52b.

Shown also in FIG. 10 are a lens 54 for condensing light rays from the holographic unit 53 and guiding the reflected light to the holographic unit 53, and a mirror 56 for reflecting a light beam traveled through the lens 54 to the recording medium 50 and guiding the reflected light reflected by the recording medium 50 to the lens 54.

The above components 52 to 55 constitute an optical system. The optical system, the magnetic head 51 and the magnetic head support spring 51a are carried by a carriage mechanism, not shown, for simultaneous movement in directions parallel to the radius of the recording medium 50.

In operation, the recording medium 50 is rotated at a fixed rotating speed by a recording medium drive motor, not shown. The magnetic gap of the magnetic head 51 supported on the head support spring 51a slides on the recording medium 50.

Next, closed-loop optical servocontrol of the optical system will be described. Light emitted by the laser diode 52a is divided into three light beams by the holographic unit 53, the three light beams are condensed by the lens 54, the three condensed light beams fall on the mirror 55, and then the mirror 55 deflects the three light beams toward the recording medium 50.

The position of the light emitting-and-receiving unit 52 is adjusted so that the three light beams are arranged in a direction at a predetermined angle to the position sensing track 50a when the three light beams are projected on the position sensing track 50a.

The three light beams deflected toward the recording medium 50 by the mirror 55 are reflected toward the mirror 55 in reflected light beams of different intensities dependent on a condition in which the three light beams fall on the recording medium 50 or on the position sensing track 50a of the recording medium 50. The mirror 55 deflects the three reflected light beams toward the lens 54, the three reflected light beams travel through the lens 54 to the holographic unit 53, and then the holographic unit 53 guides the three reflected light beams to the photodiode 52b.

Upon the reception of the three reflected light beams, the photodiode 52b generates detection signals respectively representing the intensities of the three reflected light beams. A servocontroller, not shown, receives the detection signals from the photodiode 52b and gives a drive signal to a carriage drive unit, not shown, for driving the carriage mechanism, not shown, to drive the carriage mechanism according to the contents of the detection signals. The magnetic head (more precisely, the magnetic gap) carried by the carriage mechanism is positioned relative to a predetermined track by closed-loop optical servocontrol.

In the conventional magnetic head assembly thus constructed, the holographic unit 53, the lens 54 and the mirror 55 are individual components, those components are disposed below the magnetic head support spring 51a. Therefore, it is difficult to miniaturize the magnetic head assembly and to form the magnetic head assembly in a relatively small thickness, and hence the magnetic recording apparatus employing the same magnetic head assembly cannot be miniaturized and cannot be formed in a relatively small thickness.

Techniques for integrating the optical system with the holographic unit are disclosed in Japanese patent publication JP-A No. 4-219640. Those prior art techniques, however, concern an optical system for an optical pickup, go no further than facilitating the adjustment of the optical system and in miniaturizing the optical system by the integration of the optical system, and do not realize or suggest any means effective in forming a magnetic head assembly in a relatively small thickness.

SUMMARY OF THE INVENTION

The present invention has been made to solve the foregoing problems and it is therefore a primary object of the present invention to provide a thin magnetic head assembly employing an integrated optical system.

A second object of the present invention is to provide a magnetic head assembly capable of facilitating focus adjustment.

According to one aspect of the present invention, a magnetic head assembly comprises a magnetic head for recording information on a disk-shaped recording medium or reading information recorded on a disk-shaped recording medium. A magnetic head support structure has a first mount for supporting the magnetic head thereon, a second mount on a level different by a predetermined step from the level on which the first mount lies and spaced a predetermined distance from the recording medium, and a housing space formed with the predetermined step and disposed in a predetermined interval. An optical system is fixedly supported on the second mount of the magnetic head support structure to project a plurality of light beams on the recording medium and to receive a plurality of reflected light beams from the recording medium through a light passage formed in the magnetic head.

Further, said optical system comprises a light emitting device for emitting the light beams to be projected on the recording medium. A holographic unit produces spectra of the light beams emitted by the light emitting device and projects the plurality of light beams on the recording medium so as to be focused on a position sensing track included in the recording medium, said holographic unit being partly received in the housing space. A photodetection device receives the plurality of reflected light beams through the holographic unit.

According to another aspect of the present invention, a magnetic head assembly comprises a magnetic head for recording information on a disk-shaped recording medium or reading information recorded on a disk-shaped recording medium. The magnetic head has a sliding surface to be brought into sliding contact with the disk-shaped recording medium, a first mounting surface farther from the recording medium than the sliding surface, and a second mounting surface formed between the first mounting surface and the sliding surface. A magnetic head support structure has a first mount for supporting the magnetic head at its second mounting surface, a second mount on a level different by a predetermined step from the level on which the first mount lies and spaced a predetermined distance from the recording medium, and a housing space formed with the predetermined step and disposed in the predetermined distance. An optical system is fixedly supported on the first mount of the magnetic head support structure with focusing spacers held therebetween to project a plurality of light beams on the recording medium and to receive a plurality of reflected light beams from the recording medium through a light passage formed in the magnetic head.

Further, the optical system comprises a light emitting device for emitting the light beams to be projected on the recording medium. A holographic unit produces the plurality of light beams from the light beam emitted by the light emitting device and projects the plurality of light beams on the recording medium so as to be focused on a position sensing track included in the recording medium, said holographic unit being partly received in the housing space. A photodetection device receives the plurality of reflected light beams through the holographic unit.

According to another aspect of the present invention, a magnetic head assembly comprises a magnetic head for recording information on a disk-shaped recording medium or reading information recorded on a disk-shaped recording medium. The magnetic head has a sliding surface to be brought into sliding contact with the disk-shaped recording medium, and a housing space formed by recessing a housing surface farther from the recording medium than the sliding surface A magnetic head support structure has a through hole connected to the housing space, a head holding surface for fixedly holding the magnetic head thereon, spaced a predetermined distance from the recording medium, An optical system is fixedly supported on the back surface of the head holding surface to project a plurality of light beams on the recording medium and to receive a plurality of reflected light beams from the recording medium through a light passage formed in the magnetic head.

Further, said optical system comprises a light emitting device for emitting the light beams to be projected on the recording medium. A holographic unit produces the plurality of light beams from the light beam emitted by the light emitting device and projects the plurality of light beams on the recording medium so as to be focused on a position sensing track included in the recording medium, part of said holographic unit being received through the through hole in the housing space. A photodetection device receives the plurality of reflected light beams through the holographic unit.

According to still another aspect of the present invention, a magnetic head assembly comprises a magnetic head for recording information on a disk-shaped recording medium or reading information recorded on a disk-shaped recording medium. The magnetic head has a sliding surface to be brought into sliding contact with the disk-shaped recording medium, and a housing recess formed by recessing a housing surface farther from the recording medium than the sliding surface. A magnetic head support structure has a through hole connected to the housing space, a head holding surface for fixedly holding the magnetic head thereon, spaced a predetermined distance from the recording medium. An optical system is fixedly supported on the back surface of the head holding surface to project a plurality of light beams on the recording medium and to receive a plurality of reflected light beams from the recording medium through a light passage formed in the magnetic head.

Further, said optical system comprises a light emitting device for emitting the light beams to be projected on the recording medium. A holographic unit produces the light beams from the light beam emitted by the light emitting device and projects the plurality of light beams on the recording medium so as to be focused on a position sensing track included in the recording medium, part of said holographic unit being received through the through hole in the housing space. A photodetection device receives the plurality of reflected light beams through the holographic unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
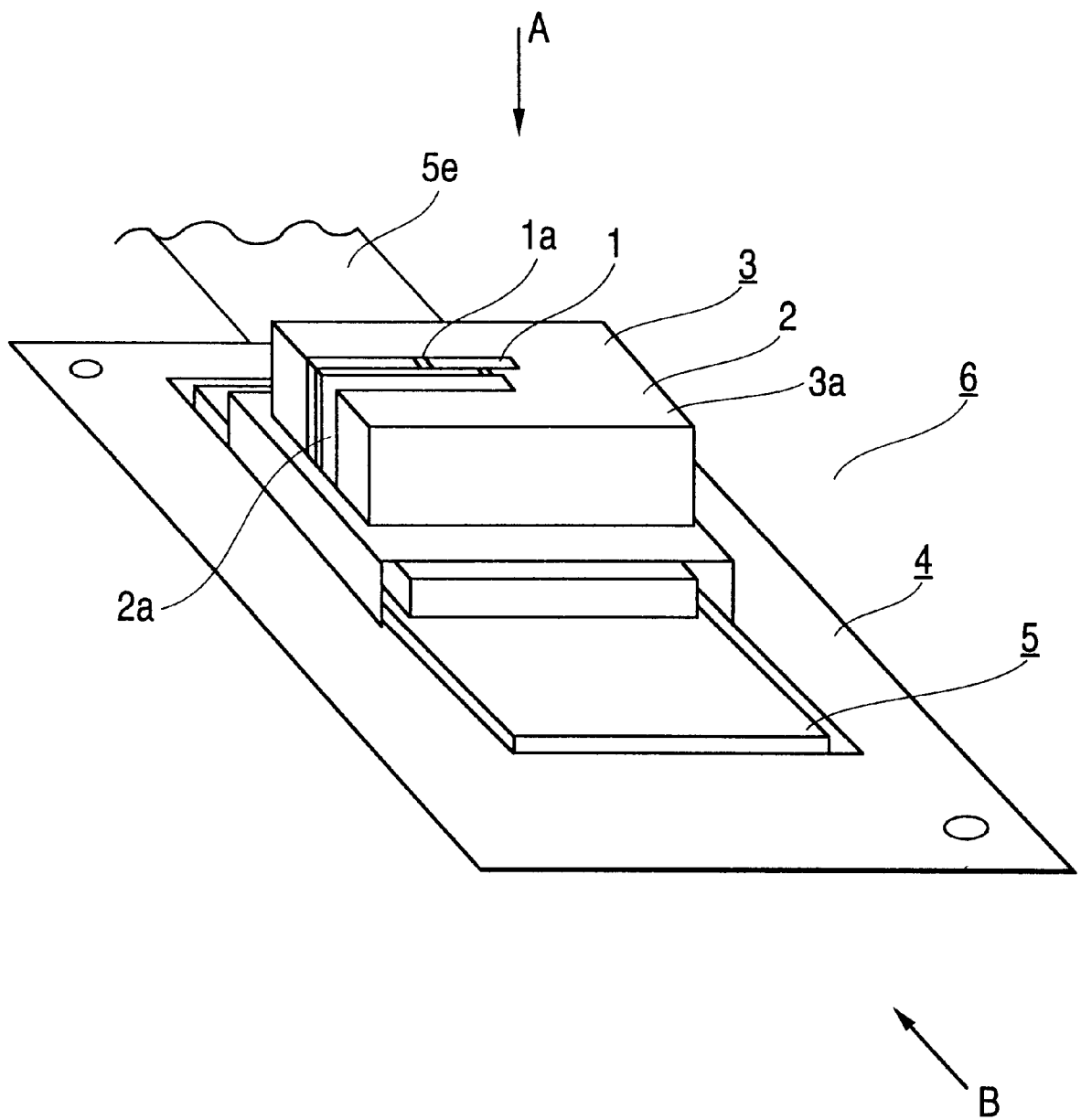
FIG. 1 is a perspective view of the magnetic head assembly in the first embodiment of the present invention.
Figure 3:
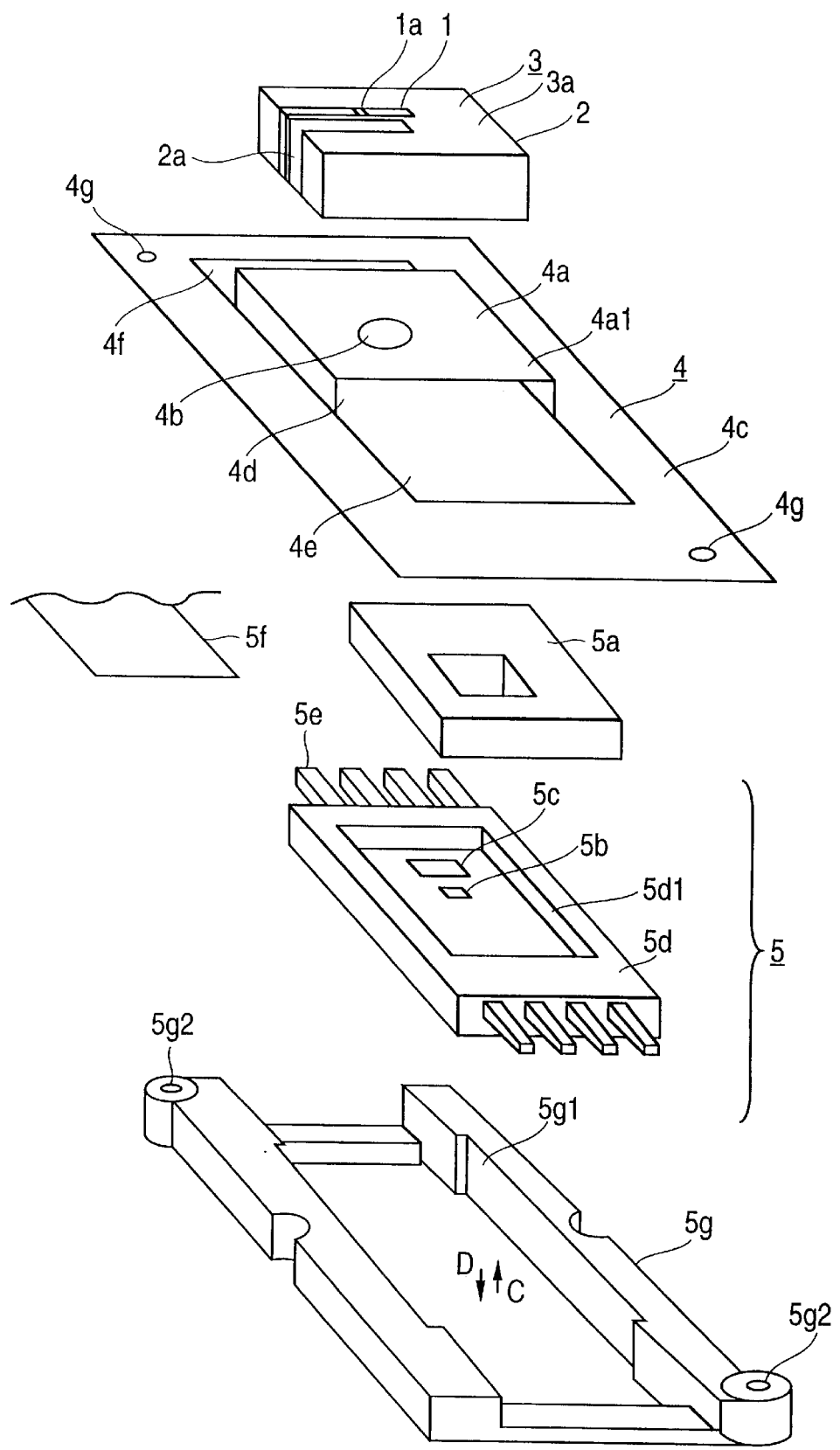
FIG. 3 is an exploded perspective view of the magnetic head assembly of FIG. 1.
Figure 4:
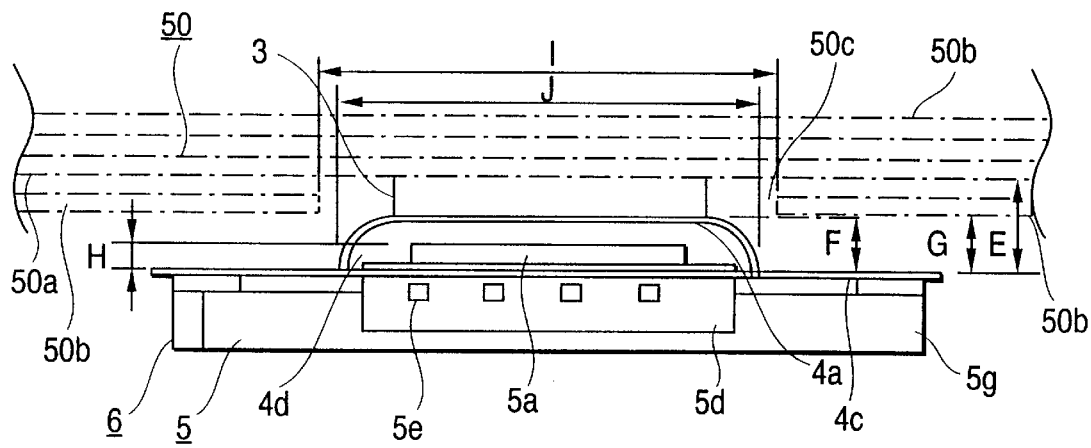
FIG. 4 is a side view taken in the direction of the arrow B in FIG. 1.

This invention will be described in further detail by way of examples with reference to the accompanying drawings.
First Embodiment A magnetic head assembly in a first embodiment according to the present invention will be described. FIG. 1 is a perspective view of the magnetic head assembly in the first embodiment, FIG. 2 is a plan view taken in the direction of the arrow A in FIG. 1, FIG. 3 is an exploded perspective view of the magnetic head assembly of FIG. 1, and FIG. 4 is a side view taken in the direction of the arrow B in FIG. 1.

Figure 2:
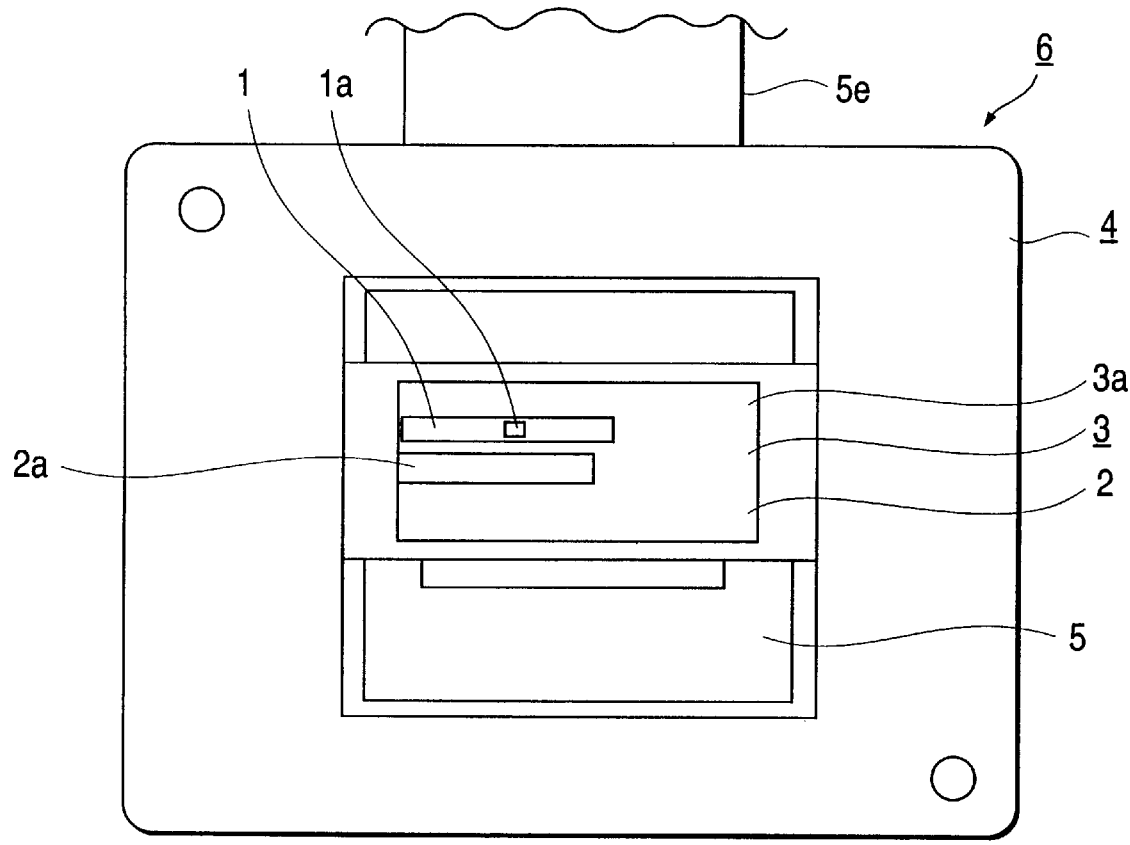
FIG. 2 is a plan view taken in the direction of the arrow A in FIG. 1.
Figure 10:
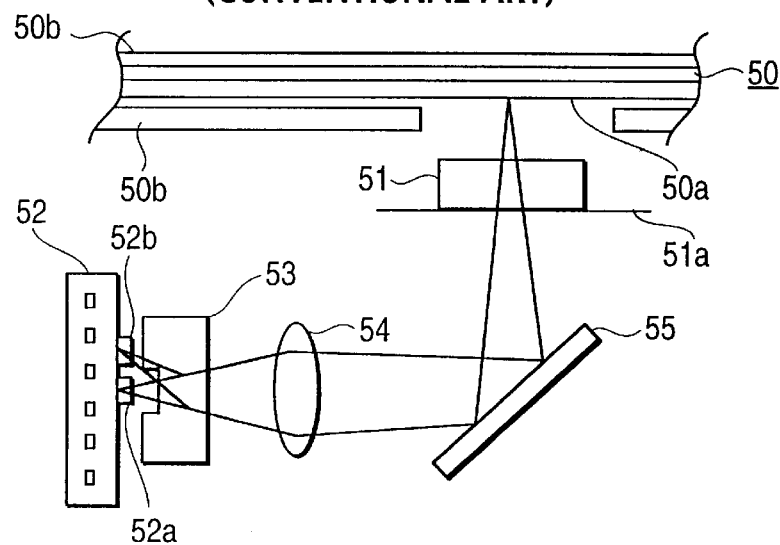
FIG. 10 is a diagrammatic view of an optical system included in a conventional magnetic recording apparatus.

Referring to FIGS. 1 and 2, there are shown a magnetic core 1 provided with a magnetic gap 1a. A slider 2, made of a ceramic material, holds the magnetic core 1. The slider 2 is provided with a light passage 2a through which positioning light beams for positioning the magnetic gap 1a relative to a predetermined recording track on a recording medium 50 (FIG. 10) travel. A magnetic head 3 has a sliding surface 3a, which slides on a recording surface of the recording medium 50 for reading information magnetically recorded on the recording medium 50 or magnetically writing information to the recording medium 50. Thus, the magnetic head 3 comprises the magnetic core 1, the slider 2 and a coil, not shown, wound on the magnetic core 1.

A magnetic head support structure 4 supports the magnetic head 3, and is formed by processing a stainless steel plate. The magnetic head support structure 4 may be formed by molding a resin, provided that the structure 4 has a sufficient strength.

The magnetic head support structure 4 is supported on, for example, a carriage mechanism, not shown, i.e., an external device for moving the magnetic head assembly to position the magnetic gap 1a relative to a predetermined recording track.

An optical unit 5 comprises, as explained later, a holographic unit including a lens, a diffracting element and such, a light emitting device and a photodetection unit. The magnetic head assembly indicated at 6 comprises the foregoing components indicated at 1 to 5.

Referring to FIG. 3, the magnetic head support structure 4 has a first mount 4a having a surface 4a1, and a second mount 4c. The magnetic head support structure 4 is disposed with the surface 4a1 of the first mount 4a facing the recording medium 50, and the slider 2 of the magnetic head 3 is fixed to the surface 4a1. An opening 4b of a predetermined size is formed in the top wall of the first mount 4a. Positioning light beams for positioning the magnetic head 3 travel through the opening 4b. The optical unit 5 is fixed to the second mount 4c. In a state where the magnetic head assembly 6 is set at a working position relative to the recording medium 50, the distance between the recording medium 50 and the second mount 4c is greater than the distance between the recording medium 50 and the first mount 4a. Usually, the second mount 4c is supported on the carriage mechanism.

A housing space 4d is defined by the first mount 4a and the second mount 4c. The first mount 4a, the second mount 4c and the housing space 4d are formed by drawing a plate. Thus, the magnetic head support structure 4 can be manufactured at a relatively low manufacturing cost. The magnetic head support structure 4 is provided with openings 4e and 4f, and threaded holes 4g are formed in the second mount 4c.

A holographic unit 5a comprises a lens, an optical diffraction element and such, and is formed of, for example, a transparent plastic plate of 1.2 mm in thickness, 2 mm in width and 3 mm in length. A light emitting device 5b employs a laser diode. A photodetection device 5c employs a photodiode and is capable of receiving a plurality of light beams. A light emitting-and-receiving unit 5d is formed by disposing the light emitting device 5b and the photodetection device 5c at predetermined positions. The light emitting-and-receiving unit 5d has an attaching surface 5d1 fixedly bonded to the holographic unit 5a with an adhesive or the like.

Signals are sent out to and received from external devices, not shown, through terminals 5e electrically connected to the light emitting device 5b and the photodetection device 5c. A flexible cable 5f connects the terminals 5e of the light emitting-and-receiving device 5d to the external devices. The light emitting-and-receiving device 5d is held on a holder 5g.

The holder 5g has a light emitting-and-receiving device holding portion 5g1 formed by recessing the inner side surfaces of side members of the holder 5g. The holder 5g holding the light emitting-and-receiving unit 5d is moved in directions perpendicular to the surface of the recording medium 50 provided with the position sensing track 50a, i.e., in the directions of the arrows C and D to adjust the position of the holographic unit 5a relative to the recording medium 50 so that the positioning light beam emitted by the holographic unit 5a is focused on the position sensing track 50a. The holder 5g has mounting portions 5g2 provided with mounting holes through which screws are screwed in the threaded holes 4g of the magnetic head support structure 4 to fasten the holder 5g to the magnetic head support structure 4. Thus, the optical unit 5 comprises the above components 5a to 5g2.

Referring to FIG. 4, the second mount 4c and the recording medium 50 are spaced a distance E of, for example, 3.0 mm apart. The distance between a plane including the first mount 4a and a plane including the second mount 4c is F. The second mount 4c and the cartridge 50b for protecting the recording medium 50 is spaced a distance G apart. The distance G is greater than the distance F. The holographic unit 5a disposed in the housing space 4d has a height H of, for example, 0.5 mm. The cartridge 50 is provided with a rectangular window 50c having a length I. The first mount 4a has portion facing the recording medium 50 and having a length J. The length I is greater than the length J and therefore, the first mount 4b ca be received in the window 50c.

Figure 5:
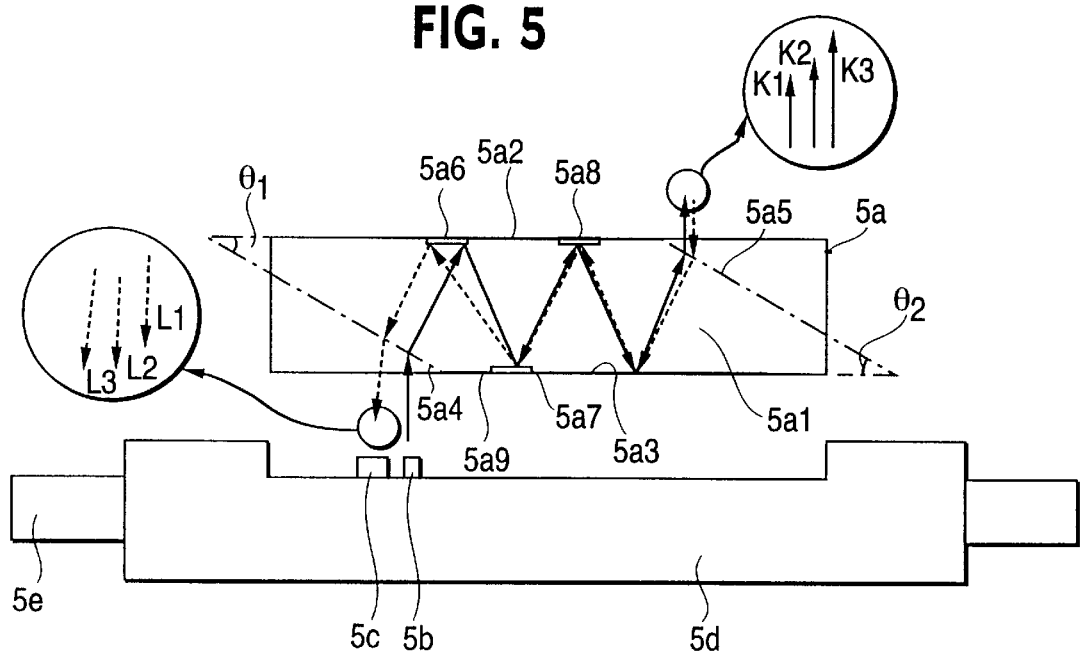
FIG. 5 shows a cross sectional view of a holographic unit.

Next, the holographic unit 5a will be described with reference to FIG. 5, in which parts like or corresponding to those shown in FIGS. 1 to 4 are designated by the same reference characters and the description thereof will be omitted. In the holographic unit 5a, an optical path is defined by a first reflecting surface 5a2 and a second reflecting surface 5a3. The first reflecting surface 5a2 and the second reflecting surface 5a3 are parallel to each other and spaced a predetermined distance apart. A light beam fallen on the holographic unit 5a travels zigzag in the optical path 5a1.

A first entrance/exit surface 5a4 is inclined at a first angle θ 1 to the first reflecting surface 5a2 and is continuous with the second reflecting surface 5a3. A second entrance/exit surface 5a5 is inclined at a second angle θ 2 to the second reflecting surface 5a3 and is continuous with the first reflecting surface 5a2. The first angle θ 1 and the second angle θ 2 are, for example, about 34°.

A first diffraction grating 5a6 is disposed in the optical path 5a1 to produce three light beams from a light beam emitted by the light emitting device 5b. The first diffraction grating 5a6 is provided with, for example, rectangular grooves of 0.05 μm in depth arranged at pitches of 13.1 μm. A second diffraction grating 5a7 serves as a beam splitter which reflects a zero-order reflected light beam among the three light beams reflected from the first diffraction grating 5a6 toward a Fresnel lens 5a8, and reflects a first-order light beam among the three light beams received from the recording medium 50 toward the first reflecting surface 5a2.

An antireflection film 5a9 prevents the reflection of light of a wavelength equal to that of the light emitted by the light emitting device 5b. The antireflection film 5a9 is a flat black coating formed on a surface facing the light emitting device 5b of the holographic unit 5a excluding the first entrance/exit surface 5a4.

The flat black coating is able to prevent substantially perfectly the reflection of the light of 8,000 Å in wavelength emitted by the light emitting device 5b. The mat finish of the black coating enhances the antireflection effect of the antireflection film 5a9.

Three positioning light beams K1, K2 and K3 emitted by the holographic unit 5a toward the recording medium 50 to position the magnetic head 3 are aligned in a straight line. The positioning light beams K1, K2 and K3 are perpendicular to the surface of the recording medium 50 provided with the position sensing track 50a. Three reflected light beams L1, L2 and L3 reflected from the recording medium 50 travel from the holographic unit 5a toward the light receiving unit 5c as shown in an enlarged view in FIG. 5.

Next, a head positioning operation to be carried out by the magnetic head assembly 6 will be described hereinafter. Light rays emitted by the light emitting device 5b (FIG. 5) are refracted at a first refraction angle of 12.5° at the first entrance/exit surface 5a4 of the holographic unit 5a, and travel in the optical path 5a1 toward the first diffraction grating 5a6 disposed on the first reflecting surface 5a2. The reflection of light rays falling on regions of the surface facing the light emitting device other than the first entrance/exit surface 5a4 among the light rays emitted by the light emitting unit 5b is prevented substantially perfectly, and hence those light rays do not affect the photodetection device 5c adversely.

The first diffraction grating 5a6 produces the three light beams K1, K2 and K3 aligned with a straight line from the light rays fallen thereon and sends the three light beams K1, K2 and K3 to the beam splitter 5a7 disposed on the second reflecting surface 5a3. The beam splitter 5a7 sends the zero-order reflected light of each of the three light beams K1, K2 and K3 to the Fresnel lens 5a8 disposed on the first reflecting surface 5a2.

Then, the three light beams K1, K2 and K3 are condensed by the Fresnel lens 5a8, travels toward the second reflecting surface 5a3, are reflected by the second reflecting surface 5a3 toward the second entrance/exit surface 5a5, and are refracted at the second entrance/exit surface 5a5 at a second refraction angle so as to fall perpendicularly on the surface of the recording medium 50 provided with the position sensing track 50a.

The three light beams K1, K2 and K3 travel through the light passage 2a formed in the slider 2 of the magnetic head 3 and fall on the position sensing track 50a of the recording medium 50. The respective intensities of three reflected light beams L1, L2 and L3, i.e., the three light beams K1, K2 and K3 reflected from the position sensing track 50a, are dependent on a condition in which the three light beams K1, K2 and K3 fall on the position sensing track 50a of the recording medium 50. The reflected light beams L1, L2 and L3 travel through the light passage 2a back to the holographic unit 5a.

The reflected light beams L1, L2 and L3 are refracted at the second entrance/exit surface 5a5 at the second refraction angle, travel into the optical path 5a1, and are reflected by the second reflecting surface 5a3 toward the Fresnel lens 5a8. The reflected light beams L1, L2 and L3 are condensed and deflected toward the beam splitter 5a7 by the Fresnel lens 5a8. The beam splitter 5a7 deflects the first-order diffracted light of each of the reflected light beams L1, L2 and L3 toward the first reflecting surface 5a2. The reflected light beams L1, L2 and L3 are reflected toward the first entrance/exit surface 5a4 by the first reflecting surface 5a2 and are refracted at the first entrance/exit surface 5a4 so as to travel toward the photodetection device 5c.

Upon the reception of the reflected light beams L1, L2 and L3, the photodetection device 5c sends detection signals representing the respective intensities of the reflected light beams L1, L2 and L3 through the terminals 53 and the flexible cable 5f to an external apparatus, not shown.

For example, the external apparatus drives the carriage mechanism, not shown, on the basis of the detection signals to position the magnetic gap 1a of the magnetic head assembly 6 relative to a predetermined recording track of the recording medium.

As described above, in the magnetic head assembly 6 of the first embodiment, the housing space 4d lies in the predetermined distance E as shown in FIG. 4, and part of the holographic unit 5a is contained in the housing space 4d in the height H. Thus, the height of the magnetic head assembly 6 is reduced. Therefore, the apparatus employing the magnetic head assembly 6 can be formed in a relatively small thickness.

In the magnetic head assembly 6, the first mount 4a is able to be received in the window 50c, so that the first mount 4a does not interfere with the cartridge 50b. Therefore, the condition of sliding of the sliding surface 3a on the recording medium 50, i.e., the so-called media contact, is not deteriorated, even if the surface of the recording medium 50 wavers.

If the housing space 4d is formed nearer to the recording medium 50 by increasing the distance F and by disposing the first mount 4a in the cartridge 50b, then the holographic unit 5a can be disposed nearer to the recording medium 50, which enables the further reduction of the magnetic head assembly 6.

In the magnetic head assembly 6, the distance F is shorter than the distance G. Thus, the first mount 4a lies within the distance G and the first mount 4a does not come into contact with the edge of the window 50c or the cartridge 50b, even if the magnetic head 3 is dislocated relative to the recording medium 50. Therefore, the magnetic head assembly 6 will not be damaged, and media contact will not be deteriorated.

In the magnetic head assembly 6, the first mount 4a, the second mount 4c and the housing space 4d of the head support structure 4 can be simultaneously formed by drawing. Therefore, the magnetic head support structure 4 can be fabricated at a relatively low manufacturing cost.

Second Embodiment

A magnetic head assembly 6 in a second embodiment according to the present invention will be described with reference to FIG. 6, in which parts like or corresponding to those shown in FIGS. 1 to 5 are designated by the same reference characters and the description thereof will be omitted.

A magnetic head 3 has a first mounting surface 3b fixedly joined to an optical unit 5. The first mounting surface 3b is spaced a predetermined distance M along the thickness from the recording medium 50. The distance M is greater than the distance between the recording medium 50 and a sliding surface 3a. The magnetic head 3 has a side surface 3c serving as a second mounting surface. The side surface 3c of the magnetic head 3 is fixedly joined to a first mount 7a.

A head support structure 7 supporting the magnetic head 3 is made by processing a stainless steel plate. The magnetic head support structure 7 has the first mount 7a. The side surface 3c of the magnetic head 3 is fixed to an edge of a rectangular through hole 7b of the first mount 7a of the head support structure 7. The magnetic head support structure 7 has a second mount 7c fixed to a carriage mechanism, not shown, for positioning a magnetic gap 1a included in the magnetic head 3 relative to a predetermined recording track of the recording medium 50. A housing space 7b is defined by a step F1 between the first mount 7a and the second mount 7c. The first mount 7a, the second mount 7c and the housing space 7d are formed simultaneously by drawing.

Focusing spacers 8 of a predetermined size N are fixed to the first mount 3b of the magnetic head 3 and to a light emitting-and-receiving unit 5d to connect the first mount 3b and the light emitting-and-receiving unit 5d mechanically.

The size N of the focusing spacers 8 is determined so that a light beam emitted by a holographic unit 5a fixed to the light emitting-and-receiving unit 5d is focused on a position sensing track 50a formed on the recording medium 50. Although the focusing spacers 8 and the light emitting-and-receiving unit 5d are separate components in the second embodiment, the focusing spacers 8 may be formed integrally with the light emitting-and-receiving unit 5d.

The holographic unit 5a contained in the housing space 7d has a height H1 of, for example, 0.7 mm, which is greater than the height H (FIG. 4).

Figure 6:
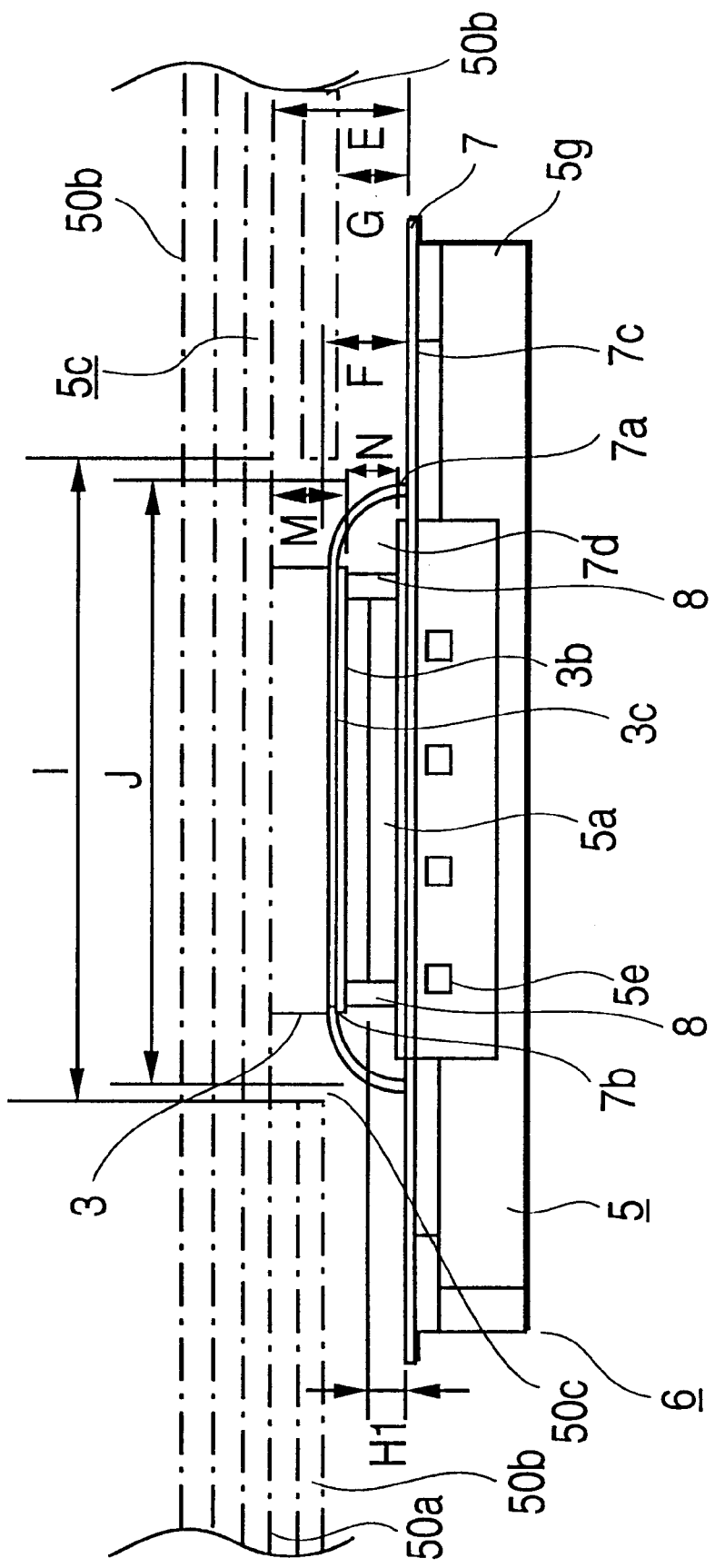
FIG. 6 shows a cross sectional view of a magnetic head assembly in a second embodiment according to the present invention.

As described above, in the magnetic head assembly 6 of the second embodiment, the first mount 7a of the support structure 7 is received in a window 50c of the cartridge 50b as shown in FIG. 6. Accordingly, the housing space 7d is closer to the recording medium 50 than the housing space 4d (FIG. 4), and the height H1 of the holographic unit 5a contained in the housing space 7d is greater than the height H (FIG. 4) of the holographic unit 5a of the magnetic head assembly 6 in the first embodiment. Therefore, the magnetic head assembly 6 can be formed in a smaller thickness.

The light emitting-and-receiving unit 5d is mechanically connected to the first mount 3b of the magnetic head 3 spaced the predetermined distance M from the sliding surface 3a by the focusing spacers 8 of the size N. Therefore, light beams projected through a second entrance/exit surface 5a5 (FIG. 5) of the holographic unit 5a on the position sensing track 50a of the recording medium 50 can be automatically focused by properly determining the dimensions of the components. Thus, focus adjusting work may be omitted.

In the magnetic head assembly 6, the first mount 7a of the magnetic head support structure 7 is able to be received in the window 50c. Accordingly, the first mount 7a does not interfere with the cartridge 50b and the so-called media contact is not deteriorated, even if the surface of the recording medium 50 wavers. The first mount 7a, the second mount 7c and the housing space 7d of the magnetic head support structure 7 can be formed simultaneously by drawing, hence the magnetic head support structure 7 can be fabricated at a relatively low manufacturing cost.

Third Embodiment

Figure 7:
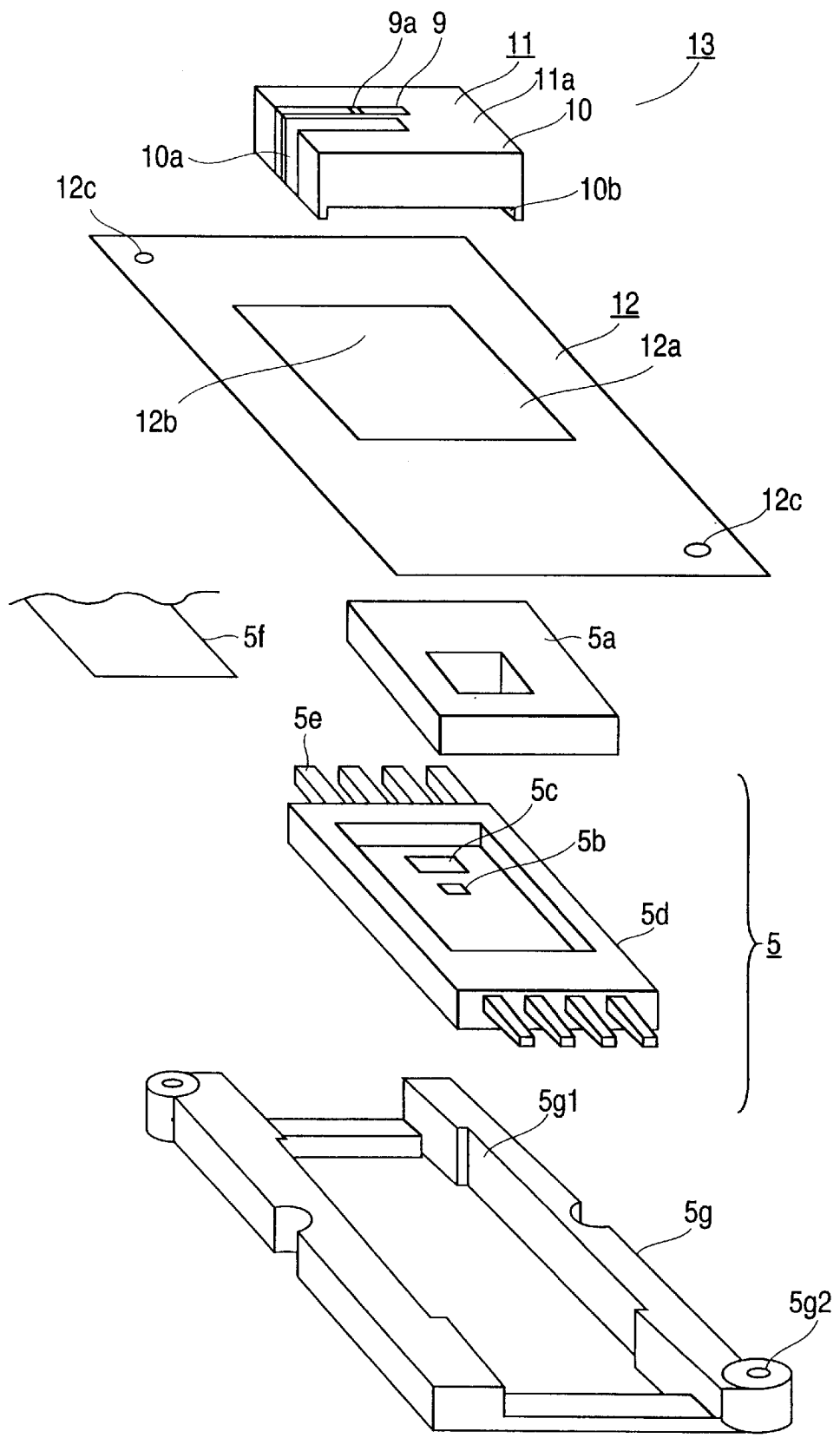
FIG. 7 is an exploded perspective view of the magnetic head assembly in a third embodiment of the present invention.

A magnetic head assembly 13 in a third embodiment according to the present invention will be described with reference to FIGS. 7 and 8, in which parts like or corresponding to those shown in FIGS. 1 to 6 are designated by the same reference characters and the description thereof will be omitted.

A magnetic core 9 is provided with a magnetic gap 9a and is held on a slider 10 made of a ceramic material or the like. The slider 10 is provided with a light passage 10a through which positioning light beams travel. A magnetic head 11 has a sliding surface 11a which slides along a surface of a recording medium 50 (FIG. 10) which is provided with recording tracks to read information magnetically recorded on the recording medium 50 or magnetically writing information to the recording medium 50.

The magnetic head 11 comprises the magnetic core 9, the slider 10 and a coil, not shown, wound on the magnetic core 9. The magnetic head 11 is provided with a housing space 11b, which receives a holographic unit 5a partly. The housing space 11b is a recess of a predetermined depth P formed in the lower surface 11c of the magnetic head 11 as shown in FIG. 8.

A magnetic head support structure 12 supporting the magnetic head 11 is formed by processing a stainless steel plate. The magnetic head support structure 12 may be formed by molding a resin, provided that the magnetic head support structure 12 of a resin has a sufficient strength. The magnetic head support structure 12 is supported on, for example, a carriage mechanism, not shown, i.e., an external device for moving the magnetic head assembly 13 to position the magnetic gap 9a relative to a predetermined recording track on the recording medium 50.

The magnetic head support structure 12 is provided with a rectangular opening 12a of a size that enables to receive a light emitting-and-receiving unit 5d. The magnetic head support structure 12 has a head mounting surface 12b extending around the opening 12a opposite to the magnetic head 11. The magnetic head 11 is fixed to the head mounting surface 12b so that the housing recess 11b is continuous with the opening 12a. The magnetic head support structure 12 is provided with threaded holes 12c. An optical unit 5 is fastened to the back surface of the magnetic head support structure 12 by inserting screws mounting holes formed in mounting portions 5g2 of a holder 5g and screwing the screws in the threaded holes 12c. Thus, the magnetic head assembly 13 comprises the above components 5, 11 and 12.

Figure 8:
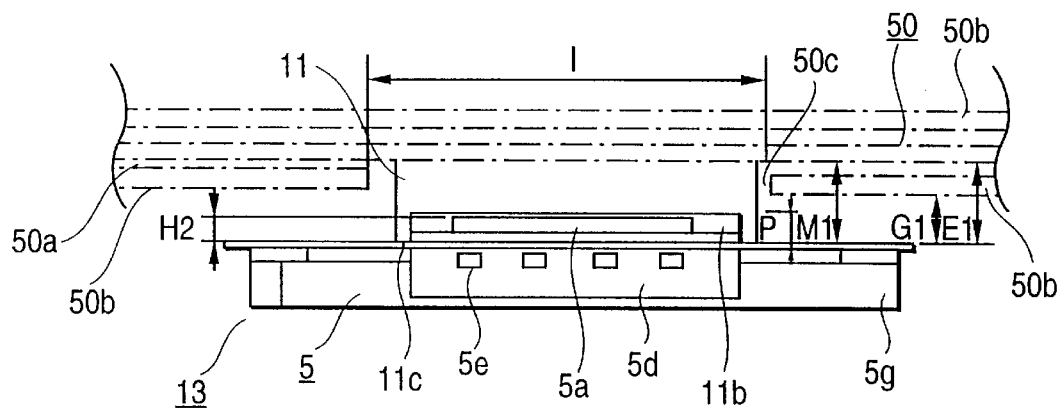
FIG. 8 is a side view of the magnetic head assembly shown in FIG. 7.

Referring to FIG. 8, a portion of the magnetic head 11 between the sliding surface 11a and the lower surface 11c has a thickness M1. The lower surface 11c is further from the recording medium 50 than the sliding surface 11a.

The magnetic head support structure 12 is spaced a predetermined distance E1 of, for example, 3.0 mm from the recording medium 50. The magnetic head support structure 12 is spaced a predetermined distance G1 from a cartridge 50b for protecting the recording medium 50. The holographic unit 5a contained in the housing recess 11b has a height H2 of, for example, 0.7 mm.

A portion having a size H2 along the height of the holographic unit 5a is received in the housing recess of the magnetic head 11 and the thickness of the magnetic head assembly 13 is reduced accordingly.

Fourth Embodiment

Figure 9:
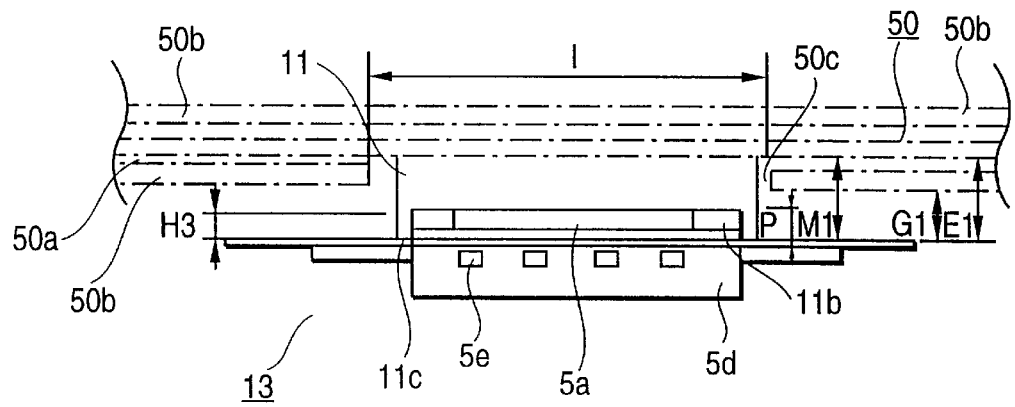
FIG. 9 is a side view of a magnetic head assembly in a fourth embodiment of the present invention.

A magnetic head assembly in a fourth embodiment according to the present invention will be described with reference to FIG. 9, in which parts like or corresponding to those shown in FIGS. 7 and 8 will be designated by the same reference characters and the description thereof will be omitted.

A holographic unit 5a contained in a housing recess 11b has a height H3 of, for example, 1.0 mm, which is greater than the size H2 (FIG. 8).

In the fourth embodiment, the holographic unit 5a is bonded with an adhesive or the like to an upper wall defining the upper limit of the housing recess 11b to support a light emitting-and-receiving unit 5d on a magnetic head 11. The housing recess 11b is a recess with a depth P formed on the housing surface 11c which is apart from the sliding surface 11a by the thickness of M1. The holographic unit 5a is fixed to the upper wall of the housing recess 11b. Accordingly, the focal length of the light emitting-and-receiving unit 5d is approximately equal to (M1−P). Therefore, light beams projected through a second entrance/exit surface 5a5 (FIG. 5) of the holographic unit 5a on the position sensing track 50a of a recording medium 50 can be automatically focused by properly determining the dimensions of the components, which enables the omission of focus adjusting work.

The effects and advantages of the present invention may be summarized as follows.

According to the present invention, the magnetic head assembly comprises the magnetic head for recording information on a disk-shaped recording medium or reading information recorded on the disk-shaped recording medium. The magnetic head support structure has the first mount for supporting the magnetic head thereon, the second mount on a level different by a predetermined step from that on which the first mount lies and spaced a predetermined distance from the recording medium, and the housing space formed with the predetermined step and disposed in a predetermined interval. The optical system is fixedly supported on the second mount of the magnetic head support structure to project the plurality of light beams on the recording medium and to receive the plurality of reflected light beams from the recording medium through the light passage formed in the magnetic head.

The optical system comprises the light emitting device for emitting the light beams to be projected on the recording medium, the holographic unit which produces spectra of the light beams emitted by the light emitting device and projects the plurality of light beams on the recording medium so as to be focused on the position sensing track of the recording medium, and the photodetection device for receiving the plurality of reflected light beams through the holographic unit. The holographic unit is partly received in the housing space. Therefore, the height of the magnetic head assembly can be reduced by a height corresponding to the height of the portion of the holographic unit received in the housing space.

In another aspect of the present invention, in the magnetic head assembly, the first mount of the magnetic head support structure is able to be received in the window formed in the cartridge for protecting the recording medium. Therefore, the first mount does not interfere with the cartridge, and it is possible to prevent the deterioration of the so-called media contact, which damages the magnetic head or makes it impossible to position the magnetic head assembly relative to a predetermined recording track, even if the surface of the recording medium wavers.

In another aspect of the present invention, in the magnetic head assembly, the first mount is disposed in a space between the cartridge for protecting the recording medium and the second mount. Therefore, the first mount does not come into contact with the window or the cartridge, even if the magnetic head assembly is dislocated from a correct position relative to the recording medium. Hence, the breakage of the magnetic head assembly and the deterioration of the media contact can be prevented.

In another aspect of the present invention, in the magnetic head assembly, the first mount, the second mount and the housing space of the magnetic head support structure are formed in a stepped arrangement by drawing. Therefore, the magnetic head support structure can be fabricated at a relatively low manufacturing cost.

According to another aspect of the present invention, the magnetic head assembly comprises the magnetic head having a sliding surface to be brought into sliding contact with a recording medium, the first mounting surface farther from the recording medium than the sliding surface, and the second mounting surface formed between the first mounting surface and the sliding surface. The magnetic head support structure has the first mount for supporting the magnetic head at its second mounting surface, the second mount on a level different by a predetermined step from that on which the first mount lies and spaced a predetermined distance from the recording medium, and the housing space formed with the predetermined step and disposed in the predetermined distance. The optical system is fixedly supported on the first mount of the magnetic head support structure with the focusing spacers held therebetween to project the plurality of light beams on the recording medium and to receive the plurality of reflected light beams from the recording medium through the light passage formed in the magnetic head. The optical system comprises the light emitting device for emitting the light beams to be projected on the recording medium, the holographic unit which produces the plurality of light beams from the light beam emitted by the light emitting device and projects the plurality of light beams on the recording medium so as to be focused on a position sensing track included in the recording medium, and the photodetection device for receiving the plurality of reflected light beams through the holographic unit. Since the holographic unit is partly received in the housing space, the height of the magnetic head assembly can be reduced accordingly. The optical unit is mechanically connected to the magnetic unit and spaced from the magnetic head by the focusing spacers. Therefore, the light beams projected through the second entrance/exit surface of the holographic unit on the position sensing track of the recording medium can be automatically focused by properly determining the dimensions of the components, which enables the omission of focus adjusting work.

In another aspect of the present invention, in the magnetic head assembly, the first mount of the magnetic head support structure is able to be received in the window formed in the cartridge for protecting the recording medium. Therefore, the first mount does not interfere with the cartridge and it is possible to prevent the deterioration of the so-called media contact which damages the magnetic head or which makes it impossible to position the magnetic head assembly relative to a predetermined recording track, even if the surface of the recording medium wavers.

In another aspect of the present invention, in the magnetic head assembly, the first mount of the magnetic head support structure is disposed in the window of the cartridge. Therefore, the size of the holographic unit contained in the housing space can be increased and the thickness of the magnetic head assembly can be further reduced.

In another aspect of the present invention, in the magnetic head assembly, the first mount, the second mount and the housing space of the magnetic head support structure are formed in a predetermined stepped arrangement in a surface of the magnetic head support structure by drawing. Therefore, the magnetic head support structure can be fabricated at a relatively low manufacturing cost.

According to another aspect of the present invention, the magnetic head assembly comprises a magnetic head having a sliding surface to be brought into sliding contact with a recording medium, and a housing space formed by recessing a housing surface farther from the recording medium than the sliding surface. The magnetic head support structure has the through hole connected to the housing space, the head holding surface for fixedly holding the magnetic head thereon, spaced a predetermined distance from the recording medium. The optical system is fixedly supported on the back surface of the head holding surface to project the plurality of light beams on the recording medium and to receive the plurality of reflected light beams from the recording medium through the light passage formed in the magnetic head. The optical system comprises the light emitting device for emitting the light beams to be projected on the recording medium, the holographic unit which produces the plurality of light beams from the light beam emitted by the light emitting device and projects the plurality of light beams on the recording medium so as to be focused on a position sensing track included in the recording medium and the photodetection device for receiving the plurality of reflected light beams through the holographic unit. Part of the holographic unit is received through the through hole in the housing space and therefore the height of the magnetic head assembly can be reduced accordingly.

According to another aspect of the present invention, the magnetic head assembly comprises the magnetic head having the sliding surface to be brought into sliding contact with a recording medium, and the housing recess formed by recessing the housing surface farther from the recording medium than the sliding surface. The magnetic head support structure has the through hole connected to the housing space, the head holding surface for fixedly holding the magnetic head thereon, spaced from the recording medium. The optical system is fixedly supported on the back surface of the head holding surface to project the plurality of light beams on the recording medium and to receive the plurality of reflected light beams from the recording medium through the light passage formed in the magnetic head. The optical system comprises the light emitting device for emitting the light beams to be projected on the recording medium, a holographic unit which produces the light beams from the light beam emitted by the light emitting device and projects the plurality of light beams on the recording medium so as to be focused on a position sensing track included in the recording medium, and the photodetection device for receiving the plurality of reflected light beams through the holographic unit. Part of the holographic unit is received through the through hole in the housing space and is fixed to the magnetic head. Therefore, the height of the magnetic head assembly can be reduced accordingly.

Obviously many modifications and variations of the present invention are possible in the light of the above teachings. It is therefore to be understood that within the scope of the appended claims the invention may by practiced otherwise than as specifically described.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A magnetic head assembly comprising:

a magnetic head for recording information on a disk-shaped recording medium or reading information recorded on a disk-shaped recording medium;

a magnetic head support structure having a first mount fixedly supporting said magnetic head thereon, a second mount on a level different by a predetermined step from the level on which the first mount lies and spaced a predetermined distance from the recording medium, wherein the predetermined steps form a housing space; and an optical system fixedly supported on said second mount of said magnetic head support structure to project a plurality of light beams on the recording medium and to receive a plurality of reflected light beams from the recording medium through a light passage formed in the magnetic head;

said optical system including;

a light emitting device for emitting the light beams to be projected on the recording medium, a holographic unit which produces spectra of the light beams emitted by said light emitting device and projects the plurality of light beams on the recording medium so as to be focused on a position sensing track included in the recording medium, said holographic unit being partly received in the housing space, and a photodetection device for receiving the plurality of reflected light beams through the holographic unit, wherein the fixed arrangement of said magnetic head and said optical system on said magnetic head support structure achieves focusing of the light beams and coincidence of optical and magnetic flux on the recording medium.

2. The magnetic head assembly according to claim 1, wherein the first mount of the magnetic head support structure is able to be received in a window formed in a cartridge for protecting the recording medium.

3. The magnetic head assembly according to claim 1, wherein the first mount of the magnetic head support structure is disposed in a space between a cartridge for protecting the recording medium and the second support portion.

4. The magnetic head assembly according to claim 2, wherein the first mount, the second mount and the housing space of the magnetic head support structure are formed in a predetermined stepped arrangement in a surface of the magnetic head support structure by drawing.

5. A magnetic head assembly comprising:

a magnetic head for recording information on a disk-shaped recording medium or reading information recorded on a disk-shaped recording medium, having a sliding surface to be brought into sliding contact with the disk-shaped recording medium, a first mounting surface farther from the recording medium than the sliding surface, and a second mounting surface formed between the first mounting surface and the sliding surface;

a magnetic head support structure having a first mount fixedly supporting said magnetic head at its second mounting surface, a second mount on a level different by a predetermined step from the level on which the first mount lies and spaced a predetermined distance from the recording medium, wherein the predetermined steps form a housing space; and an optical system fixedly supported on said first mount of the magnetic head support structure with focusing spacers held therebetween to project a plurality of light beams on the recording medium and to receive a plurality of reflected light beams from the recording medium through a light passage formed in said magnetic head;

said optical system including;
    a light emitting device for emitting the light beams to be projected on the recording medium,
    a holographic unit which produces the plurality of light beams from the light beam emitted by said light emitting device and projects a plurality of light beams on the recording medium so as to be focused on a position sensing track included in the recording medium, said holographic unit being partly received in the housing space, and
    a photodetection device for receiving the plurality of reflected light beams through said holographic unit, wherein the fixed arrangement of said magnetic head and said optical system on said magnetic head support structure achieves focusing of the light beams and coincidence of optical and magnetic flux on the recording medium.

6. The magnetic head assembly according to claim 5, wherein the first mount of the magnetic head support structure is able to be received in a window formed in a cartridge for protecting the recording medium.

7. The magnetic head assembly according to claim 6, wherein the first mount of the magnetic head support structure is disposed in the window of the cartridge.

8. The magnetic head assembly according to claim 5, wherein the first mount, the second mount and the housing space of the magnetic head support structure are formed in a predetermined stepped arrangement in a surface of the magnetic head support structure by drawing.

9. A magnetic head assembly comprising:

a magnetic head for recording information on a disk-shaped recording medium or reading information recorded on a disk-shaped recording medium, having a sliding surface to be brought into sliding contact with the disk-shaped recording medium, and a housing space formed by recessing a housing surface farther from the recording medium than said sliding surface;

a magnetic head support structure having a through hole connected to the housing space, a head holding surface fixedly holding said magnetic head thereon, spaced a predetermined distance from the recording medium; and an optical system fixedly supported on the back surface of the head holding surface to project a plurality of the light beams on the recording medium and to receive a plurality of reflected light beams from the recording medium through a light passage formed in said magnetic head;

said optical system including;
    a light emitting device for emitting the light beams to be projected on the recording medium,
    a holographic unit which produces the plurality of light beams from the light beam emitted by said light emitting device and projects the plurality of light beams on the recording medium so as to be focused on a position sensing track included in the recording medium, part of said holographic unit being received through the through hole in the housing space, and
    a photodetection device for receiving the plurality of reflected light beams through said holographic unit, wherein a part of said holographic unit is received in the housing space through the through hole, and wherein the fixed arrangement of said magnetic head and said optical system on said magnetic head support structure achieves focusing of the light beams and coincidence of optical and magnetic flux on the recording medium.

10. A magnetic head assembly comprising:

a magnetic head for recording information on a disk-shaped recording medium or reading information recorded on a disk-shaped recording medium, having a sliding surface to be brought into sliding contact with the disk-shaped recording medium, and a housing space formed by recessing a housing surface farther from the recording medium than the sliding surface;

a magnetic head support structure having a through hole connected to the housing space, a head holding surface fixedly holding said magnetic head thereon, spaced a predetermined distance from the recording medium; and an optical system fixedly supported on the back surface of the head holding surface to project a plurality of light beams on the recording medium and to receive a plurality of reflected light beams from the recording medium through a light passage formed in said magnetic head;

said optical system including;
    a light emitting device for emitting the light beams to be projected on the recording medium,
    a holographic unit which produces the plurality of light beams from the light beam emitted by said light emitting device and projects the plurality of light beams on the recording medium so as to be focused on a position sensing track included in the recording medium, part of said holographic unit being received through the through hole in the housing space, and
    a photodetection device for receiving the plurality of reflected light beams through said holographic unit,
wherein, a part of said holographic unit is received in the housing space through the through hole, and said holographic unit is fixed to said magnetic head, and
wherein the fixed arrangement of said magnetic head and said optical system on said magnetic head support structure achieves focusing of the light beams and coincidence of optical and magnetic flux on the recording medium.

* * * * *